United States Patent
Sun et al.

(10) Patent No.: US 7,672,644 B2
(45) Date of Patent: Mar. 2, 2010

(54) METHOD AND APPARATUS FOR OVERHEAD REDUCTION OF SIGNALING MESSAGES

(75) Inventors: Li-Hsiang Sun, San Diego, CA (US);
Young C Yoon, San Diego, CA (US);
Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 11/556,098

(22) Filed: Nov. 2, 2006

(65) Prior Publication Data
US 2007/0097961 A1 May 3, 2007

Related U.S. Application Data

(60) Provisional application No. 60/734,630, filed on Nov. 7, 2005, provisional application No. 60/733,017, filed on Nov. 2, 2005.

(51) Int. Cl.
*H04J 3/24* (2006.01)
*H04J 3/16* (2006.01)

(52) U.S. Cl. .................. 455/72; 370/349; 370/470

(58) Field of Classification Search ............... 370/349, 370/539
See application file for complete search history.

(56) References Cited

U.S. PATENT DOCUMENTS

| | | | | |
|---|---|---|---|---|
| 5,339,352 A | * | 8/1994 | Armstrong et al. | 455/417 |
| 5,883,928 A | * | 3/1999 | Eaton | 375/347 |
| 5,886,645 A | * | 3/1999 | Eaton | 340/7.22 |
| 6,763,104 B1 | * | 7/2004 | Judkins et al. | 379/265.09 |
| 7,298,691 B1 | * | 11/2007 | Yonge et al. | 370/203 |
| 2002/0067746 A1 | * | 6/2002 | Kitagawa | 370/539 |
| 2003/0071721 A1 | * | 4/2003 | Manis et al. | 340/310.03 |
| 2003/0083009 A1 | * | 5/2003 | Freyman et al. | 455/26.1 |
| 2005/0101299 A1 | * | 5/2005 | Farnsworth | 455/412.1 |
| 2006/0166651 A1 | * | 7/2006 | Kim | 455/412.1 |

FOREIGN PATENT DOCUMENTS

| | | |
|---|---|---|
| EP | 0854596 | 7/1998 |
| WO | WO 94/08432 | 4/1994 |

OTHER PUBLICATIONS

Razaiifar, R. "Multi-Carrier Route Update Protocol" 3GPP2 TSG-C, C25-20051024-018R1. Oct. 24, 2005.

* cited by examiner

*Primary Examiner*—Nick Corsaro
*Assistant Examiner*—Munsoon Choo
(74) *Attorney, Agent, or Firm*—Lee, Hong, Degerman, Kang & Waimey

(57) ABSTRACT

A method and apparatus to reduce the overhead of frequently sent signaling messages is provided. Various methods are presented which facilitate conveying information that is unchanged from information in the earlier part of the message, or in a previous signaling message, without sending the previous information in its entirety.

13 Claims, 19 Drawing Sheets

CDMA SPREADING AND DESPREADING

CDMA SPREADING AND DESPREADING USING MULTIPLE SPREADING SEQUENCES

CDMA 2000 CALL PROCESSING OVERVIEW

CDMA 2000 INITIALIZATION STATE

CDMA 2000 SYSTEM ACCESS STATE

CDMA 2000 MOBILE TRAFFIC CHANNEL STATE

FIG. 8
COMPARISON OF CDMA2000 FOR 1x AND 1xEV-DO
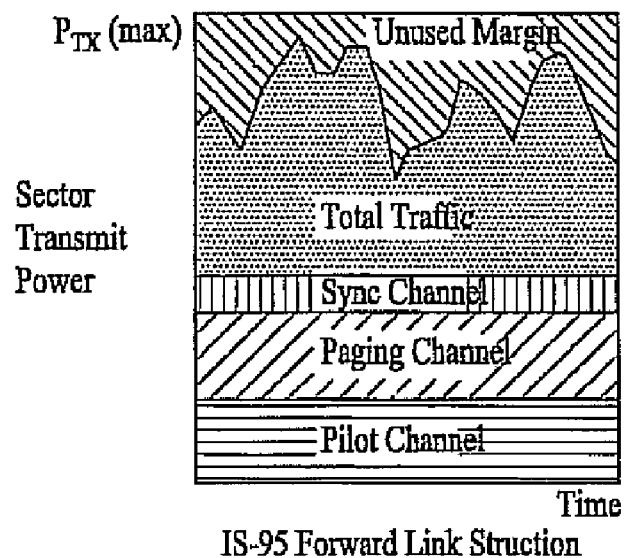
IS-95 Forward Link Struction
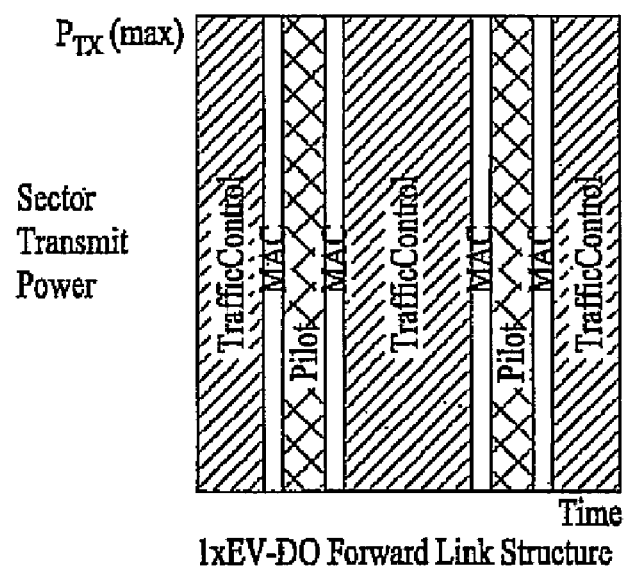
1xEV-DO Forward Link Structure 1xEV-DO NETWORK ARCHITECTURE

1xEV-DO DEFAULT PROTOCOL

1xEV-DO NON-DEFAULT PROTOCOL

1xEV-DO SESSION ESTABLISHMENT

1xEV-DO CONNECTION LAYER PROTOCOLS

FIG. 14A

TCA LITE MESSAGE

| Field | Length(bits) |
|---|---|
| MessageID | 8 |
| MessageSequence | 8 |
| Next2FieldsIncluded | 1 |
| DSCChannelGain | 5 |
| FrameOffset | 4 |
| NumSectors | 3 |
| NumForwardChannels | 4 |
| AssignedChannelIncluded | 1 |

| Field | Length(bits) |
|---|---|
| DSCIncluded | 1 |
| DSC | 0 or 3 |

| Field | Length(bits) |
|---|---|
| SymmetricFeedbackReverseChannel | 1 |
| MultipleDSC | 1 |

FIG. 14B

TCA LITE MESSAGE SECTORINFORMATION RECORD

| Field | Length(bits) |
|---|---|
| DRCCover | 3 |
| Next3FieldsIncluded | 1 |
| RAChannelGain | 0 or 2 |
| PilotPN | 0 or 9 |
| SofterHandoff | 0 or 1 |

FIG. 14C
TCA LITE MESSAGE ACTIVESETPARAMETER RECORD

| Field | Length(bits) |
| --- | --- |
| AssignedChannel | 0 or 24 |
| ChannelConfigurationIncluded | 1 |
| FeedbackMultiplexingIndex | 0 or 6 |
| ConfigurationsameasPrevChannel | 0 or 1 |
| DSCSameAsThisForwardChannel | 0 or 4 |
| FeedbackReverseChannelIndex | 4 |
| DRCLength | 0 or 2 |
| DRChannelGain | 0 or 6 |
| ACKChannelGain | 0 or 6 |
| ReverseChannelConfiguration | 0 or 2 |
| ReverseChannel | 0 or 24 |
| ReverseChannelDroppingRankIncluded | 0 or 1 |
| ReverseChannelDroppingRank | 0 or 3 |

| Field | Length(bits) |
| --- | --- |
| SectorConfigurationIncluded | 1 |
| SectorInThisfrequencyIncluded | 0 or 1 |
| PilotCarriesControlChannel | 0 or 1 |
| GroupID | 0 or 3 |
| SchedulerTagIncluded | 0 or 1 |
| SchedulerTag | 0 or 7 |
| AuxDRCCoverIncluded | 0 or 1 |
| AuxDRCCover | 0 or 3 |
| TrafficMACIndexPerInterlaceEnabled | 0 or 1 |
| NumUniqueTrafficMACIndexes | 0 or 3 |

| Field | Length(bits) |
| --- | --- |
| TrafficMACIndex | 0 or 8 |
| AssignedInterlaces | 0 or 4 |

| Field | Length(bits) |
| --- | --- |
| MACIndex | 0 or 8 |

FIG. 15A

| Field | Length(bits) |
|---|---|
| MessageID | 8 |
| MessageSequence | 8 |
| DSCChannelGainBase | 5 |
| FrameOffset | 4 |
| NumSectors | 5 |
| NumSubActiveSets | 4 |
| AssignedChannelIncluded | 1 |
| SchedulerTagIncluded | 1 |
| FeedbackMultiplexingEnabled | 1 |
| NumSectors occurrences of the following SectorInformation record: {0 | |
|   RAChannelGain | 2 |
|   PilotPN | 9 |
|   DRCCover | 3 |
|   SofterHandoff | 1 |
| }0<br>N occurrences of the following field, where N is the number of SofterHandoff fields set to '0' in this message | |
| DSC | 3 |

FIG. 15B

| Field | Length(bits) |
|---|---|
| NumSubActiveSets occurrences of the following SubActiveSetParameters record (starting from NumFwdChannelsThisSubActiveSet and ending at RABMACIndex, inclusive): {0 | |
| NumFwdChannelsThisSubActiveSet | 4 |
| NumFwdChannelsThisSubActiveSet occurrences of the following field: | |
| {1 | |
|   AssignedChannel | 0 or 24 |
| }1 | |
| FeedbackEnabled | 1 |
| FeedbackMultiplexingIndex | 0 or 9 |
| FeedbackReverseChannelIndex | 0 or 4 |
| SubActiveSetCarriesControlChannel | 1 |
| ThisSubActiveSetNotReportable | 1 |
| DSCForThisSubActiveSetEnabled | 0 or 1 |
| Next3FieldsSameAsBefore | 0 or 1 |
| DRCLength | 0 or 2 |
| DRCChannelGainBase | 0 or 6 |
| ACKChannelGain | 0 or 6 |
| NumReverseChannelsIncluded | 1 |
| NumReverseChannels | 0 or 4 |
| NumReverseChannels occurrences of the following record: | |
| {1 | |
|   ReverseChannelConfiguration | 0 or 2 |
|   ReverseBandClass | 0 or 5 |
|   ReverseChannelNumber | 0 or 11 |
|   ReverseChannelDroppingRank | 0 or 3 |
| }1 | |

FIG. 15C

| Field | Length(bits) |
|---|---|
| NumSectors occurrences of the following record:<br>{1 | |
|    PilotInThisSectorIncluded | 1 |
|    ForwardChannelIndexThisPilot | 0 or 4 |
|    PilotGroupID | 0 or 3 |
|    NumUniqueForwardTrafficMACIndices | 0 or 3 |
|    SchedulerTag | 0 or 7 |
|    AuxDRCCoverIncluded | 0 or 1 |
|    AuxDRCCover | 0 or 3 |
|    ForwardTrafficMACIndexPerInterlaceEnabled | 0 or 1 |
|    NumUniqueForwardTrafficMACIndices (if included) or<br>   zero occurrences of the following record:<br>   {2 | |
|       ForwardTrafficMACIndex | 0 or 10 |
|       AssignedInterlaces | 0 or 4 |
|    }2<br>   NumReverseChannels occurrences of the following record:<br>   {2 | |
|       ReverseLinkMACIndex | 0 or 9 |
|       RABMACIndex | 0 or 7 |
|    }2<br>}1<br>}0 | |
| Reserved | Variable |

MOBILE STATION/ACCESS TERMINAL

METHOD AND APPARATUS FOR OVERHEAD REDUCTION OF SIGNALING MESSAGES

CROSS-REFERENCE TO RELATED APPLICATIONS

Pursuant to 35 U.S.C. § 119(a), this application claims the benefit of U.S. Provisional Application Ser. Nos. 60/734,630 filed on Nov. 7, 2005 and 60/733,017 filed on Nov. 2, 2005, the contents of which are hereby incorporated by reference herein in their entirety.

BACKGROUND OF THE INVENTION

1. Field of the Invention

This invention is related to a method and apparatus to reduce the overhead of frequently sent signaling messages.

2. Description of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

Referring to FIG. 1, a wireless communication network architectures is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one or more BS's 6 as well as other public networks, for example a Public Switched Telephone Network (PSTN) (not shown) or integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 101 11 is an IS-41 standard interface 18.

The Packet Data Serving Node (PDSN) 12 portion of the PSCN 8 provides routing for packet data traffic to and from MS 2. The PDSN 12 establishes, maintains, and terminates link layer sessions to the MS 2's 2 and may interface with one or more BS 6 and one or more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in Read Only Memory (ROM).

A short PN code is another type of spreading sequence. A short PN Code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN Code s generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or public long code mask, computed using its unique ESN (Electronic Serial Number) of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN offset of the individual MS 2. Reverse channels include traffic channels and access channels.

Individual users use traffic channels during actual calls to transmit traffic to the BTS 3. A reverse traffic channel is basically a user-specific Public or Private Long Code Mask and there are as many reverse traffic channels as there are CDMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, forward power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Reverse power control uses three methods in tandem to equalize all terminal signal levels at the BTS 3. Reverse open loop power control is characterized by the MS 2 adjusting power up or down based on a received BTS 3 signal (AGC). Reverse closed loop power control is characterized by the BTS 3 adjusting power up or down by 1 db at a rate of 800 times per second. Reverse outer loop power control is characterized by the BSC 4 adjusting a BTS 3 set point when the BSC has Forward Error Correction (FER) trouble hearing the MS 2.

The actual RF power output of the MS 2 transmitter (TXPO), including the combined effects of open loop power control from receiver AGC and closed loop power control by the BTS 3, cannot exceed the maximum power of the MS, which is typically +23 dbm. Reverse power control is performed according to the equation "TXPO=$-(RX_{dbm})$-C+TXGA," where "TXGA" is the sum of all Closed Loop power control commands from the BTS 3 since the beginning of a call and "C" is +73 for 800 MHZ systems and +76 for 1900 MHz systems.

Using a RAKE receiver allows a MS 2 to use the combined outputs of the three or more traffic correlators, or "RAKE fingers," every frame. Each RAKE finger can independently recover a particular PN offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. Air interface messages are sent by dim-and-burst without muting. Each end of the communication link chooses the best configuration on a frame-byframe basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 3 illustrates a data link protocol architecture layer 20 for a cdma2000 wireless network. The data link protocol architecture layer 20 includes an Upper Layer 60, a Link Layer 30 and a Physical Layer 21.

The Upper Layer 60 includes three sublayers; a Data Services sublayer 61; a Voice Services sublayer 62 and a Signaling Services sublayer 63. Data Services 61 are services that deliver any form of data on behalf of a mobile end user and include packet data applications such as IP service, circuit data applications such as asynchronous fax and B-ISDN emulation services, and SMS. Voice Services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

In the MS 2, the Signaling Services sublayer 63 is also responsible for maintaining call process states, specifically a MS 2 Initialization State, MS 2 Idle State, System Access State and MS 2 Control on Traffic Channel State.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC subtayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The LAC sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 21 is responsible for coding and modulation of data transmitted over the air. The Physical Layer 21 conditions digital data from the higher layers so that the data may be transmitted over a mobile radio channel reliably.

The Physical Layer 21 maps user data and signaling, which the MAC sublayer 31 delivers over multiple transport channels, into a physical channels and transmits the information over the radio interface. In the transmit direction, the functions performed by the Physical Layer 21 include channel coding, interleaving, scrambling, spreading and modulation. In the receive direction, the functions are reversed in order to recover the transmitted data at the receiver.

FIG. 4 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 control on Traffic Channel State, with the dedicated forward and reverse traffic channels carrying user information, such as voice and data.

FIG. 5 illustrates the Initialization State of a MS 2. The Initialization State includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System determination. A service provider using a redirection process may also control System Determination. After the MS 2 selects a system, it must determine on which channel within that system to search for service. Generally the MS 2 uses a prioritized channel list to select the channel.

Pilot Channel Acquisition is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

FIG. 6 illustrates the System Access State. The first step in the system access process is to update overhead information to ensure that the MS 2 is using the correct Access channel parameters, such as initial power level and power step increments. A MS 2 randomly selects an access channel and transmits without coordination with the BS 6 or other MS.

FIG. 7 illustrates a Mobile Traffic Channel state. The Mobile Traffic Channel state includes Service Negotiation, an Active Mode and a Control Hold Mode.

Service Negotiation is a process by which the MS 2 and the BS 6 negotiate which service options will be used during a call and how the radio channel will be configured to support those services. Typically, Service Negotiation occurs at the beginning of a call, although it may occur at any time during a call if necessary. FIG. 15 illustrates the Service Negotiation process between a BS 6 and MS 2.

While operating in the Traffic Channel Substate, the MS 2 may operate in either the Active Mode or the Control Hold Mode. In the Active Mode, the Reverse Pilot channel is active, along with either the R-FCH, R-DCCH. R-SCH or R-PDCH may be active if high-speed data is available. In the Control Hold Mode, only the Reverse Pilot channel is transmitted and it may be operating in a gated mode, such as ½ or ¼, to reduce transmit power.

The MS 2 enters the Control Hold Mode when directed by the BS 6 to stop transmitting on R-FCH and R-DCCH. While in the Control Hold Mode, if the MS 2 has user data to send, it may request that supplemental channels be assigned. If the BS 6 grants this assignment, the MS 2 transitions back to the Active Mode and resumes transmitting the continuous Pilot channel and either the R-FCH or R-DCCH channel.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the Sync Channel, Forward Common Control Channel, Broadcast Control Channel, Paging Channel and Access Channel Procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1xEV-DO system is optimized for packet data service and characterized by a single 1.25 MHz carrier ("1x") for Data Only or Data Optimized ("DO"). Furthermore, there is a peak data rate of up to 4.9152 Mbps on the Forward Link and up to 1.8432 Mbps on the Reverse Link. Moreover 1xEV-DO provides separated frequency bands and internetworking with a 1x System. FIG. 8 illustrates a comparison of cdma2000 for 1x and 1xEV-DO.

In a cdma2000 system, there are concurrent services, whereby voice and data are transmitted together at a maximum data rate of 614.4 kbps and 307.2 kbps in practice. An MS 2 communicates with the MSC 5 for voice calls and with the PDSN 12 for data calls. CDMA2000 is characterized by a fixed rate with variable power with a Walsh-code separated forward traffic channel.

In a 1xEV-DO system, the maximum data rate is 4.9152 Mbps and there is no communication with the circuit-switched core network 7. 1xEV-DO is characterized by fixed power and a variable rate with a single forward channel that is time division multiplexed.

FIG. 9 illustrates a 1xEV-DO architecture. In a 1xEV-DO system, a frame consists of 16 slots, with 600 slots/sec. and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1xEV-DO system facilitates simpler and faster channel estimation and time synchronization, FIG. 10 illustrates a 1xEV-DO system default protocol architecture. FIG. 11 illustrates a 1xEV-DO system non-default protocol architecture.

Information related to a session in a 1xEV-DO system includes a set of protocols used by an MS 2, or Access Terminal (AT), and a BS 6, or Access Network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The Steam Layer provides the ability to multiplex up to 4 (default) or 244 (non-default) application streams for one AT 2.

The Session Layer ensures the session is still valid and manages closing of session, specifies procedures for the initial UATI assignment, maintains AT addresses and negotiates/provisions the protocols used during the session and the configuration parameters for these protocols.

FIG. 12 illustrates the establishment of a 1xEV-DO session. As illustrated in FIG. 12, establishing a session includes address configuration, connection establishment, session configuration and exchange keys.

Address configuration refers to an Address Management protocol assigning a UATI and Subnet mask. Connection establishment refers to Connection Layer protocols setting up a radio link. Session configuration refers to a Session Configuration Protocol configuring all protocols. Exchange keys refer to a Key Exchange protocol in the Security Layer setting up keys for authentication.

A "session' refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session. There are two connection states in a 1xEV-DO system, a closed connection and an open connection.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Connection Layer manages initial acquisition of the network, setting an open connection and closed connection and communications. Furthermore, the Connection Layer maintains an approximate AT 2 location in both the open connection and closed connection and manages a radio link between the AT 2 and the AN 6 when there is an open connection. Moreover, the Connection Layer performs supervision in both the open connection and closed connection, prioritizes and encapsulates transmitted data received from the Session Layer, forwards the prioritized data to the Security Layer and decapsulates data received from the Security Layer and forwards it to the Session Layer.

FIG. 13 illustrates Connection Layer Protocols. As illustrated in FIG. 13, the protocols include an Initialization State, an Idle State and a Connected State.

In the Initialization State, the AT 2 acquires the AN 6 and activates the initialization State Protocol. In the Idle State, a Closed Connection is initiated and the Idle State Protocol is activated. In the connected State, an open connection is initiated and the Connected State Protocol is activated.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead Message Protocol broadcasts essential parameters, such as QuickConfig, SectorParameters and AccessParameters message, over the Control channel. The Packet Consolidation Protocol consolidates and prioritizes packets for transmission as a function of their assigned priority and the target channel as well as providing packet de-multiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1xEV-DO forward link is characterized in that no power control and no soft handoff is supported for the packet data channel (also referred to as the forward traffic channel). The AN 6 transmits at constant power and the AT 2 requests variable rates on the forward link. Because different users may transmit at different times in TDM, it is difficult to implement diversity transmission from different BS's 6 that are intended for a single user.

In the MAC Layer, two types of messages originated from higher layers are transported across the physical layer, specifically a user data message and a signaling message. Two protocols are used to process the two types of messages, specifically a forward traffic channel MAC Protocol for the user data message and a control channel MAC Protocol, for the signaling message.

The Physical Layer 21 is characterized by a spreading rate of 1.2288 Mcps, a frame consisting of 16 slots and 26.67 ms, with a slot of 1.67 ms and 2048 chips. The forward link channel includes a pilot channel, a forward traffic channel or control channel and a MAC channel.

The pilot Channel is similar to the to the cdma2000Pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse link ACK channel before all of the allocated slots have been transmitted, the remaining slots shall not be transmitted.

The control channel is similar to the sync channel and paging channel in cdma2000. The control channel is characterized by a period of 256 slots or 427.52 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The traffic operations supported by the forward link include Data Rate Control (DRC) reporting, Scheduling at the BS 6, data transmission to the selected user and ACK/NAK.

Data Rate Control (DRC) reporting facilitates an AT 2 reporting DRC as often as once every 1.67 ms. Each active AT 2 measures its radio conditions and provides the measurements to the BS 6, with a data rate of (600/DRCLength) DRC values per second. Parameters reported include DRCLength, DRCGating, DRCLock channel, DRCOffset and DRC Channel.

DRCLength determines how often DRC values are computed by the AT 2 and determines the gain for the DRC channel, with the lowest for 8 slots. Possible values are 1, 2, 4 or 8 slots.

DRCGating determines whether the AT 2 sends the DRC values continuously or discontinuously. Possible values are 0×00 for continuous and 0×01 for discontinuous.

DRCOffset facilitates computing the transmitted DRC by subtracting the DRCOffset from the tentative DRC and is suitable for a more realistic environment.

DRC Channel is used by the AT 2 to indicate the selected serving sector and the requested data rate on the forward traffic channel to the AN 6. The requested data rate is mapped into a 4-digit DRC value, with an 8-ary Walsh function corresponding to the selected serving sector used to spread the DRC channel transmission. The DRCCover from the Forward Traffic channel MAC protocol defines the cover mapping. DRC values are transmitted at a data rate of 600/DRCLength DRC values per second, with a maximum rate of 600 per second and a minimum rate of 75 per second.

The 1xEV-DO reverse link is characterized in that the AN 6 can power control the reverse link by using reverse power control and more than one AN can receive the AT's 2 transmission via soft handoff. Furthermore, there is no TDM on the reverse link, which is channelized by Walsh code using a Long PN code.

In the reverse link, two MAC Layer protocols are used to process two types of messages. A reverse traffic channel MAC protocol is used to process user data messages and an access channel MAC protocol is used to process signaling messages.

Using the reverse traffic channel MAC protocol, the AN 6 provides information to the AT 2 including BroadcastReverseRateLimit, UnicastReverseRateLimit, Reverse Activity Bit, Transition Probability matrix and Rate Parameters. Reverse link channels include reverse traffic channels and access channels.

Reverse traffic channels include a data channel, pilot channel, MAC channel and ACK channel. Primary and auxiliary pilot channels may be provided.

The MAC channel further includes a Reverse Rate Indicator (RRI) channel, Data Rate Control (DRC) channel and Data Source Control (DSC) channel. Access channels include a pilot channel and data channel.

As the number of carriers grows, so does the overhead. For example, the level of overhead for a Traffic Channel Assignment (TCA) message, which is transmitted by AN to manage AT's active set in the connected state, can assume a size greater than 300 bits when there are 2 carriers and an active set of 2 or a size on the order of 2000 bits when there are 15 carriers and an active set of 2. Since the TCA message may be sent frequently, such as every few seconds, much of the information remains static while only a small portion changes. Therefore, conventional methods, which repeat all the information whether static or changed, are inefficient.

Therefore, there is a need for a more efficient means to communicate information, most of which is static. The present invention addresses this and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. The invention is directed to provide a method and apparatus to reduce the overhead of frequently sent signaling messages.

In one aspect of the present invention, a method of providing signaling information in a multi-carrier mobile communication system is provided. The method includes generating a signaling message by concatenating a plurality of fields and transmitting the signaling message, wherein at least two of the plurality of fields convey similar information, a first of the at least two fields including the information and the second of the at least two fields including a flag, the flag indicating that a value of the second of the at least two fields is the same as the information in the first of the at least two fields.

It is contemplated that the signaling message is a traffic channel assignment message. It is further contemplated that the second of the at least two fields includes a flag indicating that a value of a plurality of consecutively concatenated fields is the same as the information in a previous plurality of consecutively concatenated fields.

In another aspect of the present invention, a method of providing signaling information in a mobile communication system is provided. The method includes receiving a signaling message including a plurality of concatenated fields, determining that at least one of the plurality of fields includes a flag, the flag indicating that a value of the field is the same as information in a previous field and setting the value of the at least one of the plurality of fields to the information of the previous field.

It is contemplated that the signaling message is a traffic channel assignment message. It is further contemplated that the method further includes determining that the flag indicates that a value of a plurality of consecutively concatenated fields is the same as the information in a previous plurality of consecutively concatenated fields and setting the value of the plurality of consecutively concatenated fields to the information in the previous plurality of consecutively concatenated fields.

In another aspect of the present invention, a method of providing signaling information in a mobile communication system is provided. The method includes generating a first signaling message and a second signaling message, each message including at least one field and transmitting the first signaling message and the second signaling message, wherein at least one field in the second signaling message includes a flag, the flag indicating that a value of the at least one field in the second signaling message is the same as information in a corresponding at least one field in the first signaling message such that the second signaling message is shorter than the first signaling message.

It is contemplated that the at least one field in the second signaling message includes a flag indicating that a value of a plurality of consecutively concatenated fields in the second signaling message is the same as the information in a corresponding plurality of consecutively concatenated fields in the first signaling message. It is further contemplated that the first and second signaling messages each further comprise an incremental message sequence number, the sequence number of the second signaling message incremented from the sequence number of the first signaling message.

It is contemplated that the method further includes re-transmitting the second signaling message if it is determined that the second signaling message was not received, the sequence number of the resent second signaling message remaining unchanged. It is further contemplated that the method further includes determining whether the value of the least one field in the first signaling message is still applicable after transmitting the second signaling message.

It is contemplated that the method further includes generating at least a third signaling message, the third signaling message including the at least one field including the flag indicating that the value of the at the at least one field is the same as information in the corresponding at least one field in the first signaling message such that the third signaling message is shorter than the first signaling message and transmitting the at least a third signaling message. It is further contemplated that the first and second signaling messages each further comprise a message identification field.

It is contemplated that the message identification fields of the first and second signaling messages are the same. It is further contemplated that the message identification fields of the first and second signaling messages are different.

In another aspect of the present invention, a method of providing signaling information in a mobile communication system is provided. The method includes receiving a first signaling message and a second signaling message, each of the signaling messages including at least one field, determining that at least one field in the second signaling message includes a flag, the flag indicating that a value of the at least one field in the second signaling message is the same as information in a corresponding at least one field in the first signaling message and setting the value of the at least one field in the second signaling message to the information in the corresponding at least one field in the first signaling message. Preferably, the method further includes determining that the at least one field in the second signaling message includes a flag indicating that a value of a plurality of consecutively concatenated fields in the second signaling message is the same as the information in a corresponding plurality of consecutively concatenated fields in the first signaling message and setting the value of the plurality of consecutively concatenated fields in the second signaling message to the information in the corresponding plurality of consecutively concatenated fields in the first signaling message.

In another aspect of the present invention, a method of providing signaling information in a mobile communication system is provided. The method includes generating a signaling message including at least one field including a flag, the flag indicating whether a certain feature is activated and transmitting the signaling message, wherein, if the flag indicates that the certain feature is activated, the signaling message includes at least one additional field related to the certain feature and, if the flag indicates that the certain feature is not activated, the signaling message includes no additional field related to the certain feature such that the signaling message is shorter if the certain feature is not activated.

In another aspect of the present invention, a method of providing signaling information in a mobile communication system is provided. The method includes receiving a signaling message including at least one field including a flag, the flag indicating whether a certain feature is activated and extracting at least one additional field related to the certain feature from the message if the flag indicates that the certain feature is activated and extracting no additional field related to the certain feature from the message if the flag indicates that the certain feature is not activated such that less fields are extracted from the signaling message if the certain feature is not activated.

In another aspect of the present invention, a mobile terminal is provided. The mobile terminal includes a transmitting/receiving unit adapted to transmit and receive signaling messages, a display unit adapted to display user interface information, an input unit adapted to input user data and a processing unit adapted to generate and control the transmitting/receiving unit to transmit a signaling message, the signaling message generated by concatenating a plurality of fields such that at least two of the plurality of fields convey similar information, a first of the at least two fields including the information and the second of the at least two fields including a flag, the flag indicating that a value of the second of the at least fields is the same as the information in the first of the at least two fields.

It is contemplated that the second of the at least two fields includes a flag indicating that a value of a plurality of consecutively concatenated fields is the same as the information in a previous plurality of consecutively concatenated fields. It is further contemplated that the processing unit is further adapted to receive a signaling message including a plurality of concatenated fields, determine that at least one of the plurality of fields includes a flag, the flag indicating that a value of the field is the same as information in a previous field and set the value of the at least one of the plurality of fields to the information of the previous field.

It is contemplated that the signaling message is a traffic channel assignment message. It is further contemplated that the processing unit is further adapted to determine that the flag indicates that a value of a plurality of consecutively concatenated fields is the same as the information in a previous plurality of consecutively concatenated fields and set the value of the plurality of consecutively concatenated fields to the information in the previous plurality of consecutively concatenated fields.

It is contemplated that the processing unit is further adapted to generate and transmit a first signaling message including at least one field and generate and transmit a second signaling message including at least one field, wherein the at least one field in the second signaling message includes a flag indicating that a value of the at least one field in the second signaling message is the same as information in a corresponding at least one field in the first signaling message such that the second signaling message is shorter than the first signaling message. It is further contemplated that the at least one field in the second signaling message includes a flag indicating that a value of a plurality of consecutively concatenated fields in the second signaling message is the same as the information in a corresponding plurality of consecutively concatenated fields in the first signaling message.

It is contemplated that the processing unit is further adapted to include an incremental message sequence number in the first and second signaling messages such that the sequence number of the second signaling message is incremented from the sequence number of the first signaling message. It is further contemplated that the processing unit is further adapted to re-transmit the second signaling message if it is determined that the second signaling message was not received, the sequence number of the resent second signaling message remaining unchanged.

It is contemplated that the processing unit is further adapted to determine whether the value of the least one field in the first signaling message is still applicable after transmitting the second signaling message. It is further contemplated that the processing unit is further adapted to generate and transmit at least a third signaling message, the third signaling message including the at least one field including the flag indicating that the value of the at the at least one field is the same as information in the corresponding at least one field in the first signaling message such that the third signaling message is shorter than the first signaling message.

It is contemplated that the first and second signaling messages each further comprise a message identification field. It is further contemplated that the message identification fields of the first and second signaling messages are the same.

It is contemplated that the message identification fields of the first and second signaling messages are different. It is further contemplated that the processing unit is further adapted to receive a first signaling message and a second signaling message, each of the signaling messages including at least one field, determine that at least one field in the second signaling message includes a flag, the flag indicating that a value of the at least one field in the second signaling message is the same as information in a corresponding at least one field in the first signaling message and set the value of the at least one field in the second signaling message to the information in the corresponding at least one field in the first signaling message.

It is contemplated that the processing unit is further adapted to determine that the at least one field in the second signaling message includes a flag indicating that a value of a plurality of consecutively concatenated fields in the second signaling message is the same as the information in a corresponding plurality of consecutively concatenated fields in the first signaling message and set the value of the plurality of consecutively concatenated fields in the second signaling message to the information in the corresponding plurality of consecutively concatenated fields in the first signaling message. It is further contemplated that the processing unit is further adapted to generate and transmit a signaling message including at least one field, the at least one filed including a flag indicating whether a certain feature is activated, wherein the signaling message includes at least one additional field related to the certain feature if the flag indicates that the certain feature is activated and the signaling message includes no additional field related to the certain feature if the flag indicates that the certain feature is not activated such that the signaling message is shorter if the certain feature is not activated. Preferably, the processing unit is further adapted to receive a signaling message including at least one field including a flag indicating whether a certain feature is activated and extract at least one additional field related to the certain feature from the message if the flag indicates that the certain feature is activated and extract no additional field related to the certain feature from the message if the flag indicates that the certain feature is not activated such that less fields are extracted from the signaling message if the certain feature is not activated.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 8 illustrates a comparison of cdma2000 for 1× and 1xEV-DO.

FIGS. 14A-C illustrate a TCA message according to one embodiment of the present invention.

FIGS. 15A-C illustrate a TCA message according to another embodiment of the present invention

DETAILED DESCRIPTION OF THE PREFERRED EMBODIMENTS

Figure 1:
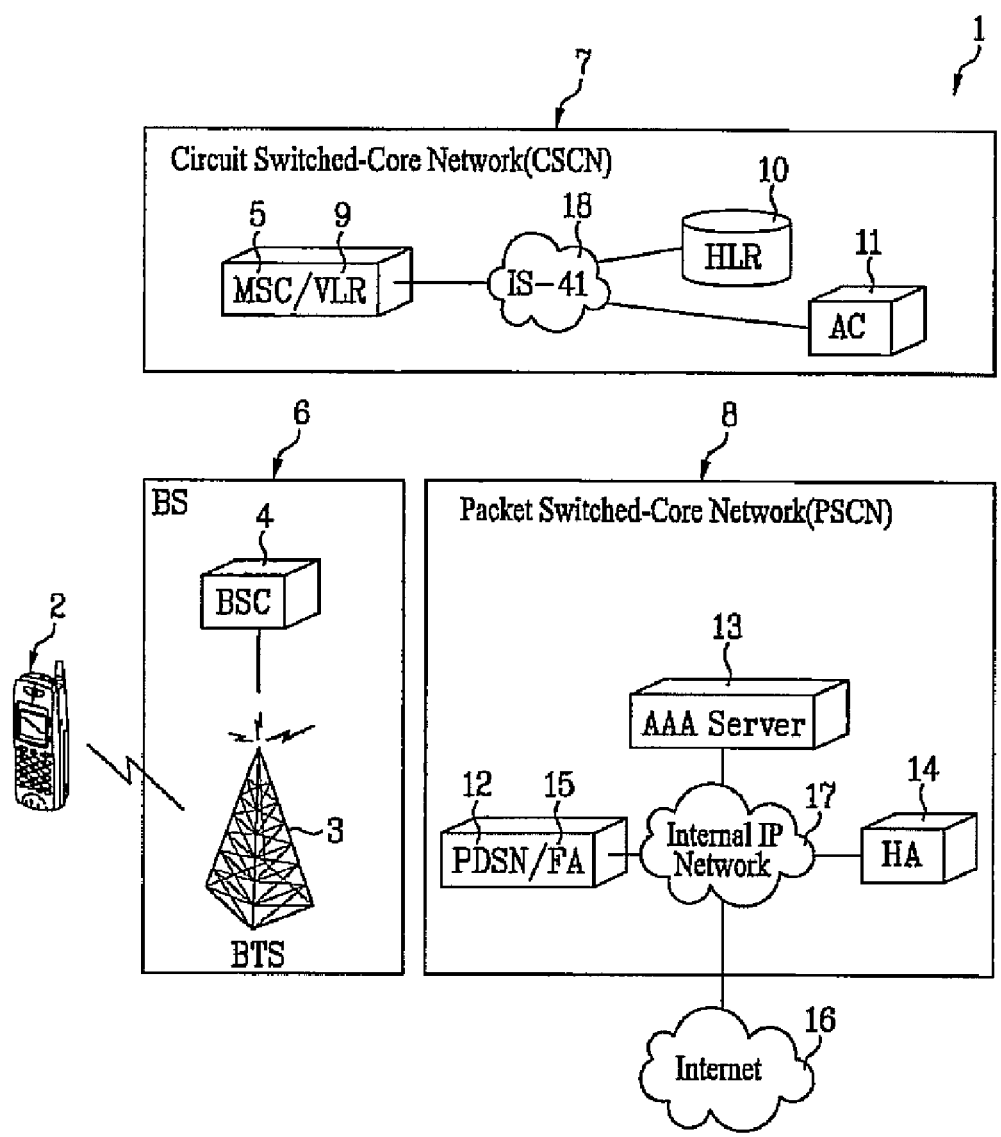
FIG. 1 illustrates wireless communication network architecture.
Figure 2A:
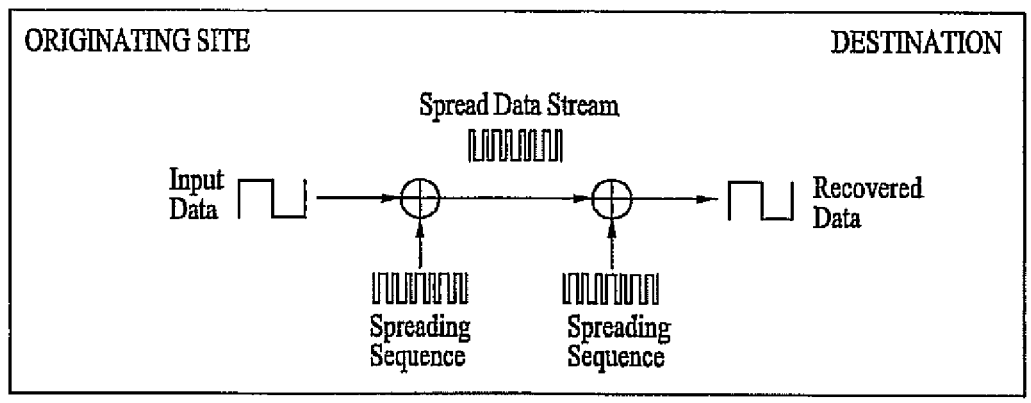
FIG. 2A illustrates a CDMA spreading and de-spreading process.
Figure 2B:
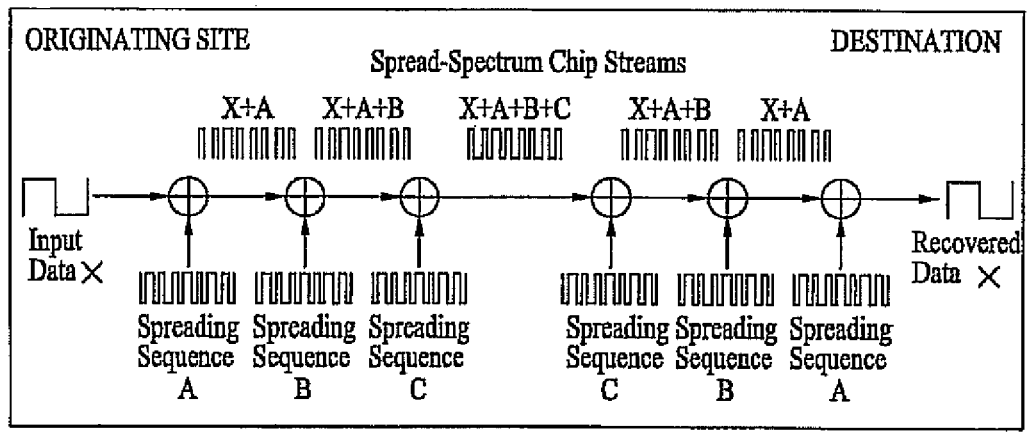
FIG. 2B illustrates a CDMA spreading and de-spreading process using multiple spreading sequences.
Figure 3:
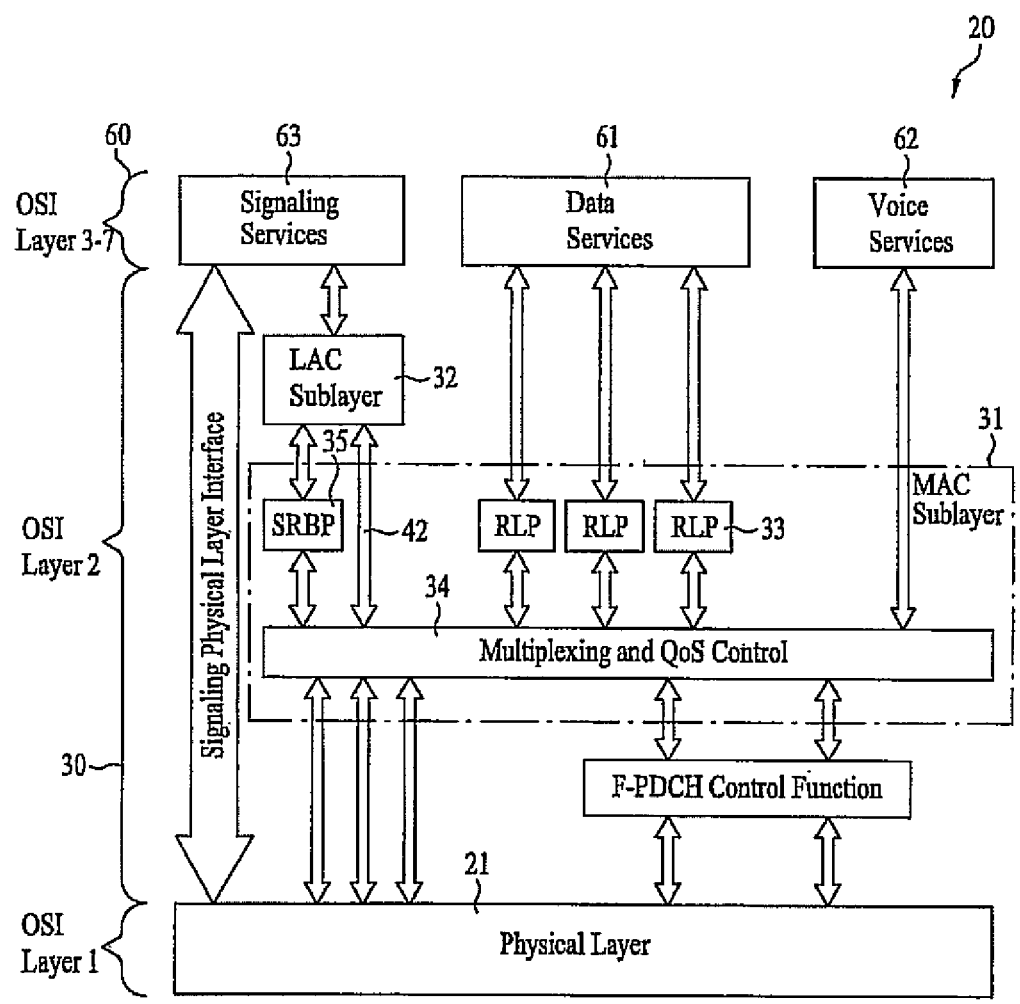
FIG. 3 illustrates a data link protocol architecture layer for a cdma2000 wireless network.
Figure 4:
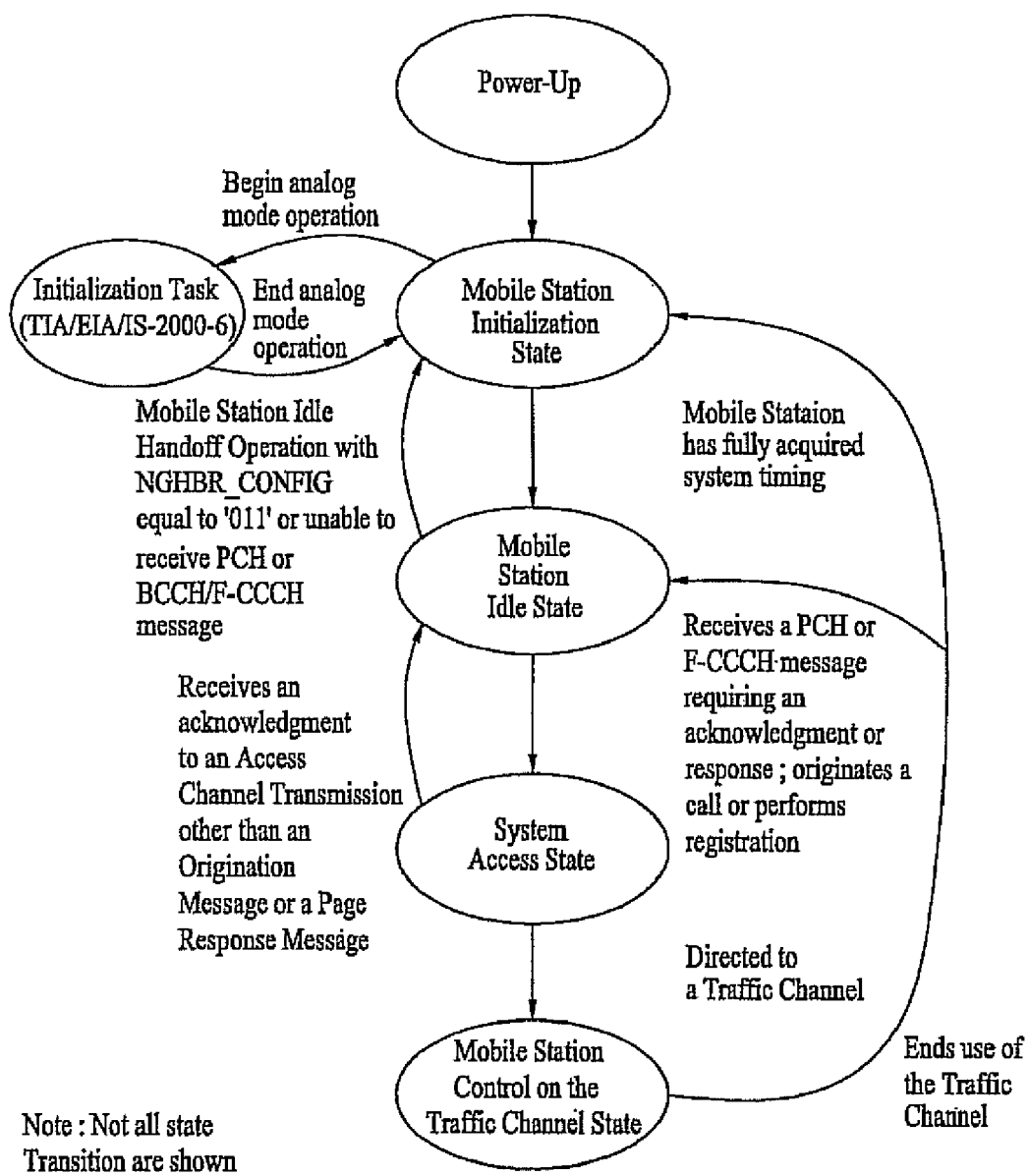
FIG. 4 illustrates cdma2000 call processing.
Figure 5:
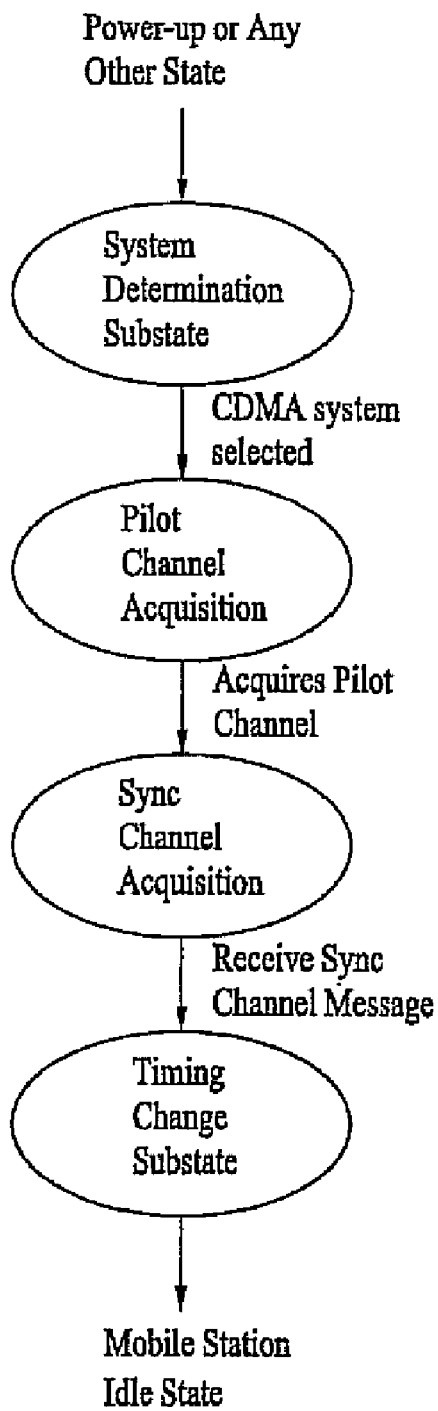
FIG. 5 illustrates the cdma2000 initialization state.
Figure 6:
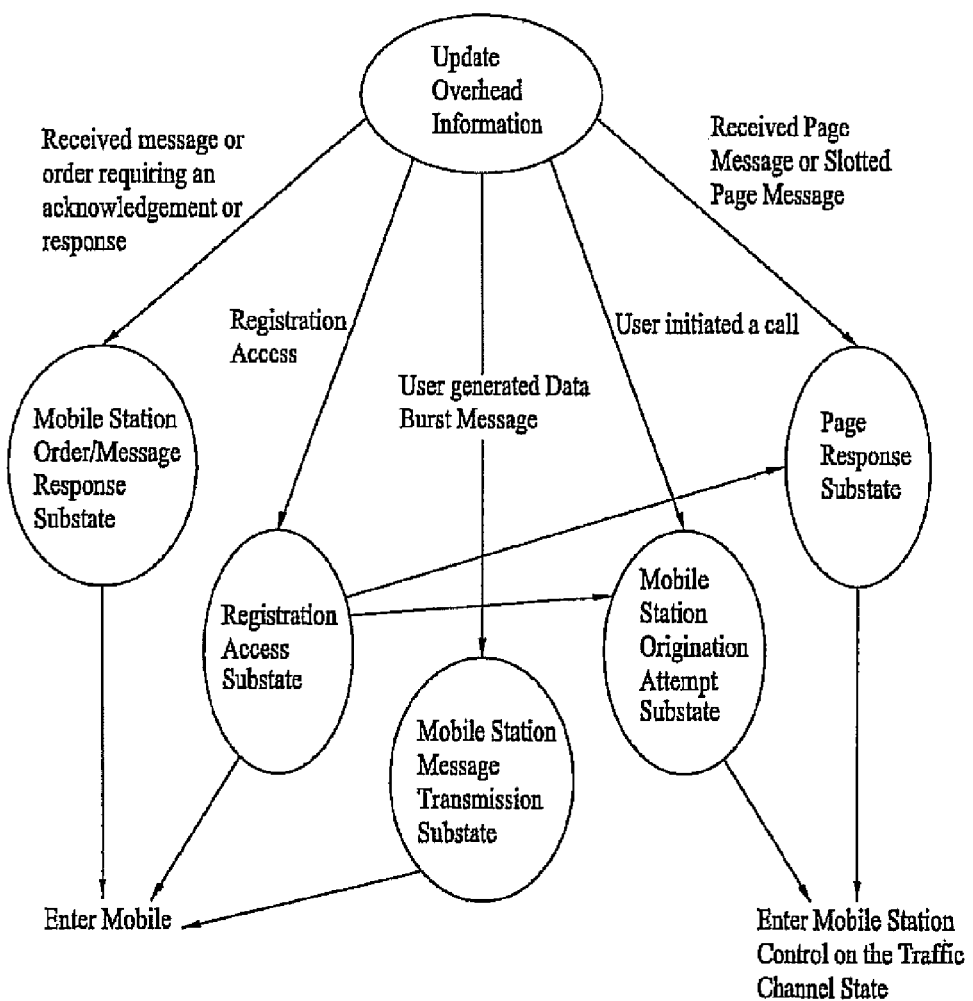
FIG. 6 illustrates the cdma2000 system access state.
Figure 7:
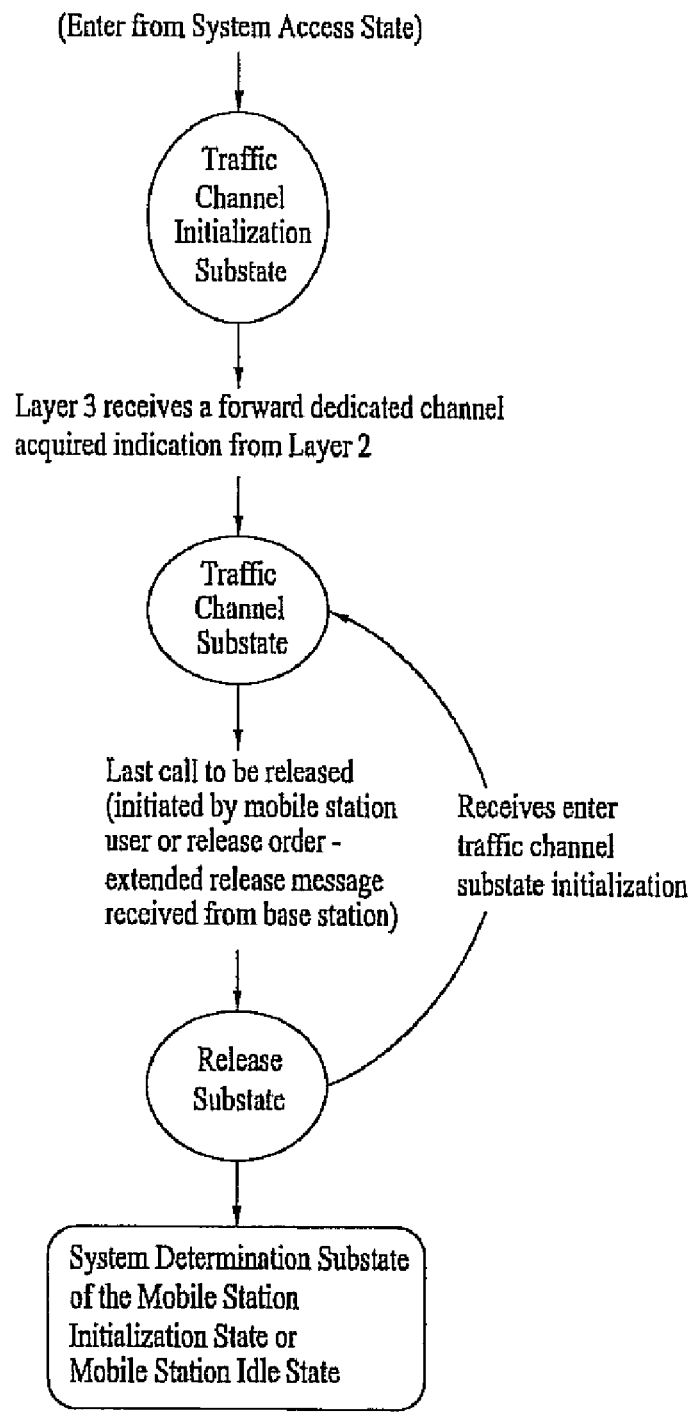
FIG. 7 illustrates the cdma2000 mobile traffic channel state.
Figure 9:
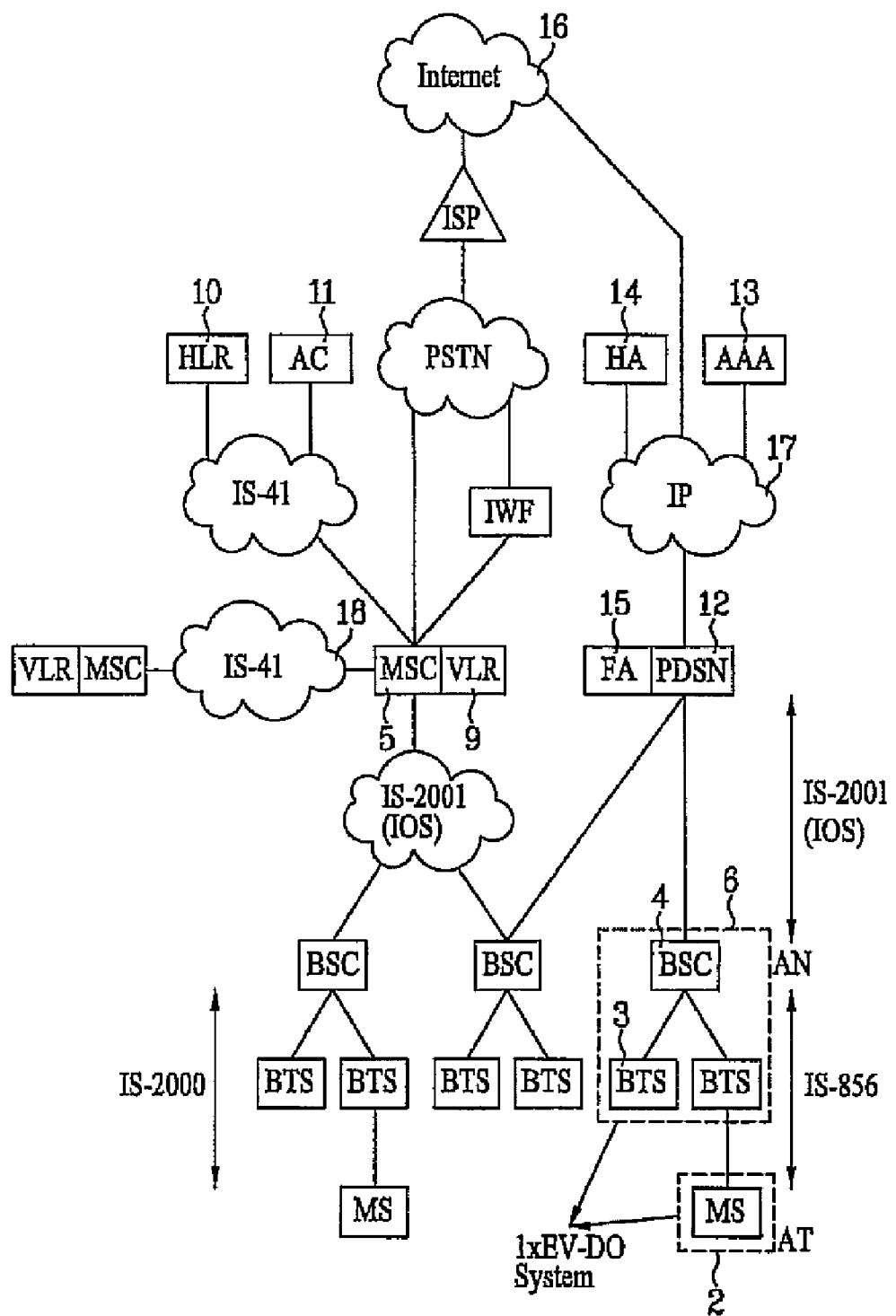
FIG. 9 illustrates a network architecture layer for a 1xEV-DO wireless network.
Figure 10:
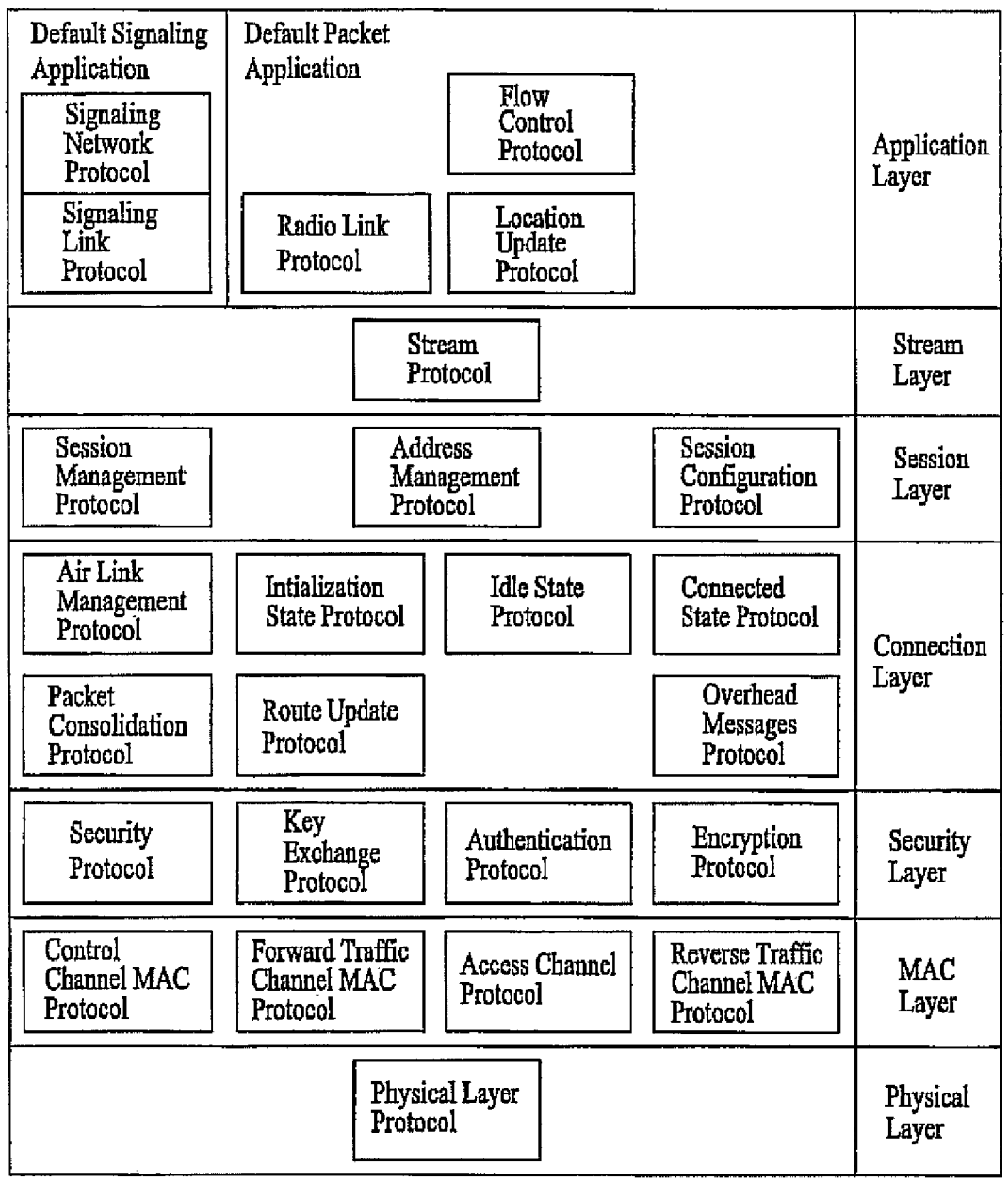
FIG. 10 illustrates 1xEV-DO default protocol architecture.
Figure 11:
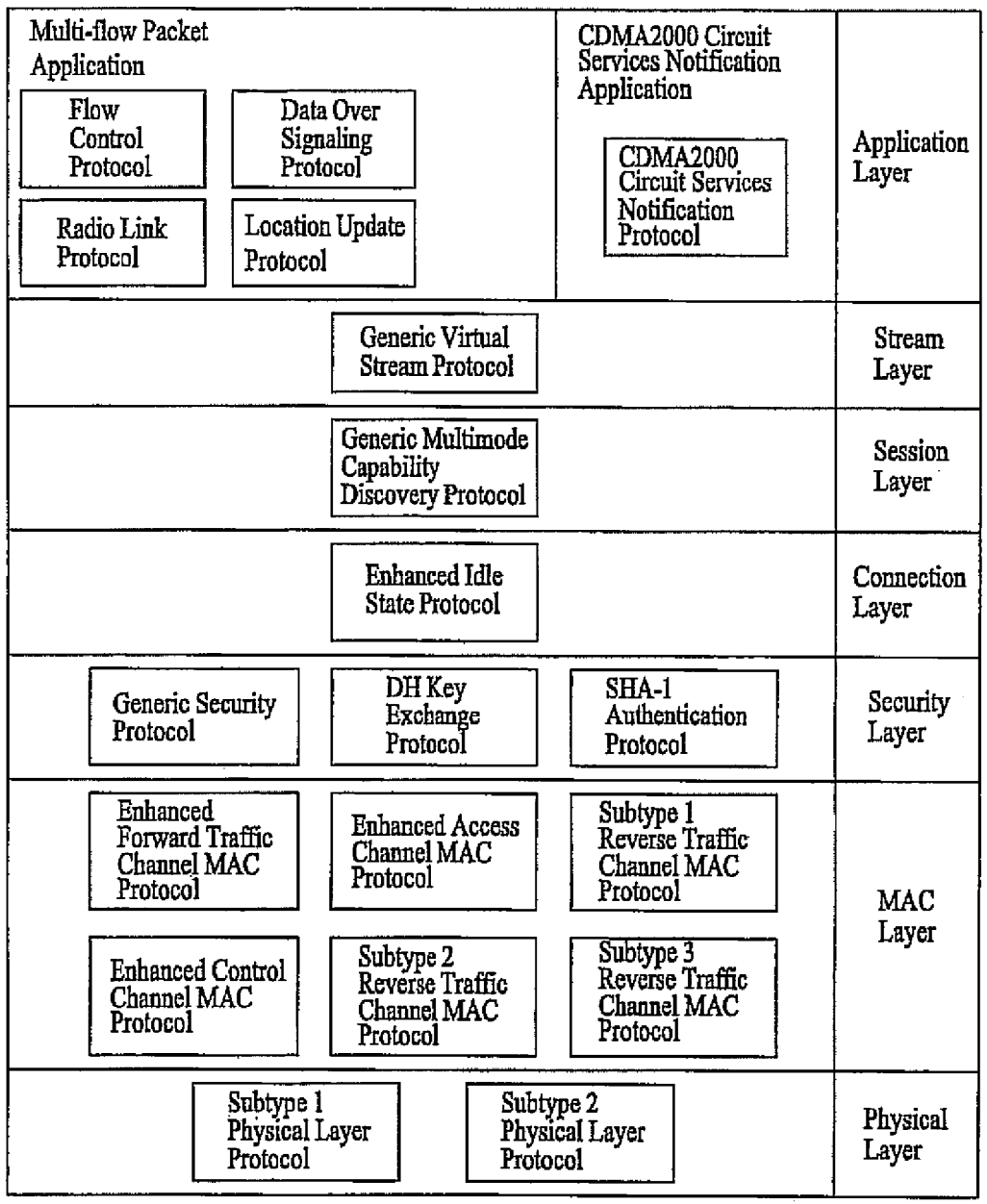
FIG. 11 illustrates 1xEV-DO non-default protocol architecture.
Figure 12:
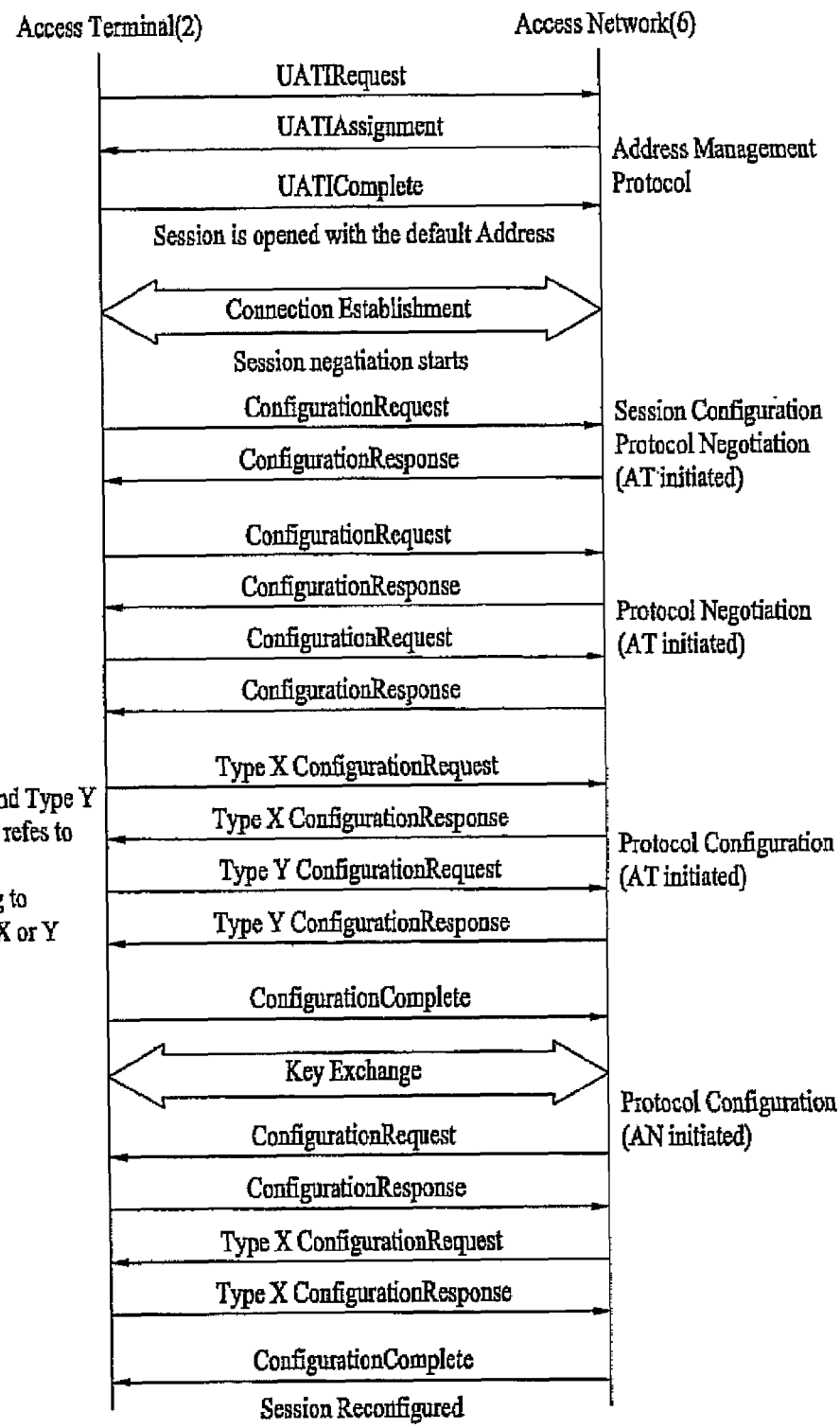
FIG. 12 illustrates 1xEV-DO session establishment.
Figure 13:
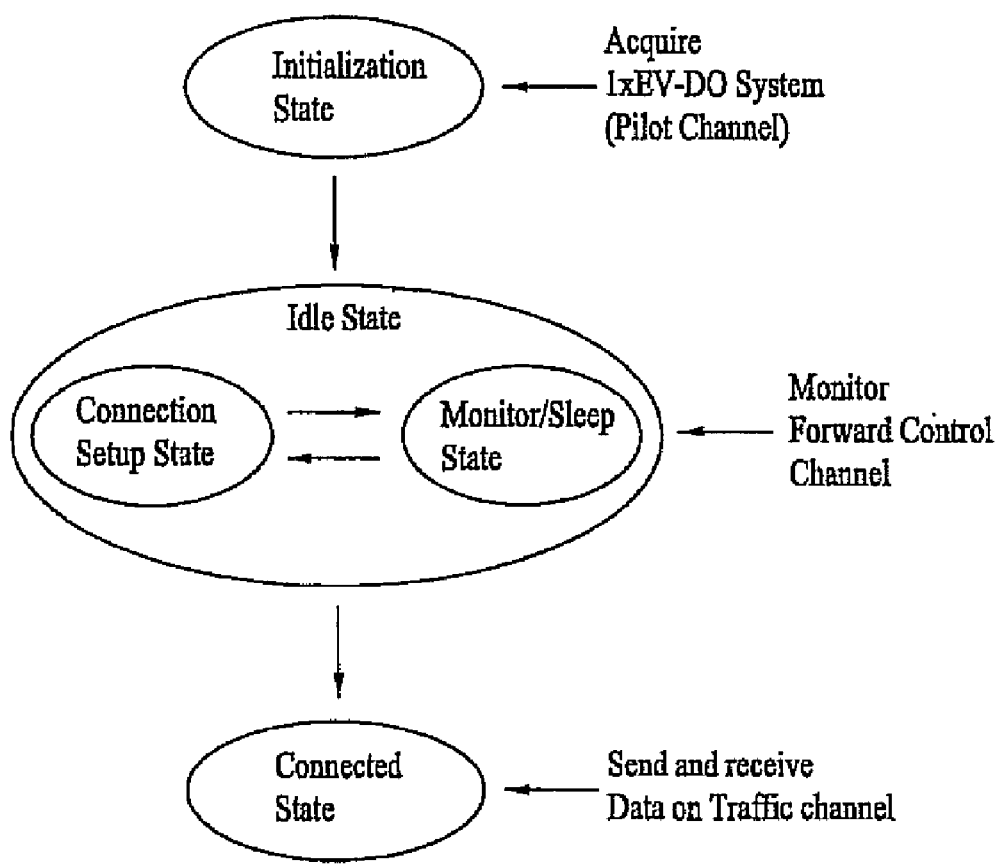
FIG. 13 illustrates 1xEV-DO connection layer protocols.

The present invention relates to a method and apparatus to reduce the overhead of frequently sent signaling messages. Although the present invention is illustrated with respect to a mobile terminal and access network, it is contemplated that the present invention may be utilized anytime it is desired to reduce the overhead of frequently sent signaling messages in communication devices.

One method to reduce the overhead of frequently sent signaling messages is to send a lightweight version of a signaling message instead of sending a self-contained signaling message, or full version signaling message, when information is unchanged. By omitting the unchanged information that was already conveyed in either a previous a full version or lightweight version a signaling message, the size of the lightweight signaling message is reduced.

The order of delivery for the same type of messages to a receiver is maintained. As used herein, "TCA message" refers to a full version signaling message and "TCA Lite message" refers to a lightweight signaling message. The TCA message and TCA Lite message may be the messages with the same message id, but the later TCA Lite message has flags indicating the omission of the information that was already conveyed in the TCA message.

The use of lightweight signaling messages, which omits the information conveyed by a previous message, may present problems if the receiver misses the previous signaling message, since the transmitter may assume that the receiver has received the message. If the next message is a full version signaling message, no problem occurs. However, if the following message is a lightweight signaling message, there is a possibility that information indicated in the previous signaling message, but absent in the next lightweight signaling message, are missed by the receiver.

Therefore, a mechanism to detect missed messages is provided. An incremental message sequence number may be used in order to detect missed messages.

Furthermore, ambiguity may exist if a TCA Lite message is sent without having received an acknowledgement, such as TrafficChannelComplete (TCC), for a first signaling message, either a TCA or TCA Lite message. Ambiguity may occur since the AT 2 may not know how to interpret the TCA Lite message in the absence of the first signaling message.

For example, if a TCC for a first TCA message or TCA Lite message is received, there is no problem. However, if a TCC for a first TCA message or TCA Lite message is not received, then the AT 2 will discard the subsequent TCA Lite message in the absence of decoding the first TCA message or TCA Lite message.

Potential ambiguity may be avoided in two ways when a TCA Life message must be sent before a TCC for a previous TCA message or TCA Lite message is received and while a timer is active. A simple option is to send the full version signaling message. A slightly more complication option is to send another lightweight signaling message. However, it should be noted that the likelihood of sending two signaling messages so close together is very low.

Sending a TCA message in place of a TCA Lite message if an acknowledgment for a first TCA message or TCA Lite message has not yet been received provides the AT 2 with the entire signaling information. If a TCA Lite message is sent and a TC Complete (acknowledgement) is not received, then, the TCA Lite message should be sent with the same sequence number if it is sent again.

Another method to reduce the overhead of frequently sent signaling messages is to include flags to indicate whether features used infrequently are activated by the signaling message. If a feature is not activated, the related parameters can be omitted from the signaling message.

Another method to reduce the overhead of frequently sent signaling messages is to Iterate components in a signaling message with the same or similar parameters in the same message such that the same information can be omitted by using a flag indicating that the value of one or more fields is the same as in a previous iteration. Note this approach may be applied to the original signaling message as well as the lightweight signaling message in order to reduce overhead.

Another method to reduce the overhead of frequently sent signaling messages is to use the TCA Lite message to convey the information sent in a conventional TCA message. In this way, the TCA Lite message may be used to either replace the current TCA message or as an additional TCA message.

Another method to reduce the overhead of frequently sent signaling messages is a differential approach whereby a new signaling message is compared to a previously sent signaling message. The difference between the two signaling messages can be sent such that the AT 2 can reconstruct the new signaling message based on the previously received signaling message.

Another method to reduce the overhead of frequently sent signaling messages is to create a new and separate signaling message, or "TCA Special x" message, which can be used to send specific portions of the full TCA message. The "x" is used to denote different TCA special messages. For example, a TCA special message can be designed to send only those parameters related to active set management. Alternately, a TCA Lite message having special flags may be used to implement the TCA special message instead of creating a separate message.

The network may periodically send the full version TCA message to ensure that the AT 2 has the correct values. In this way, additional security is may be provided for any of the methods described herein.

FIGS. 14A-C illustrate a lightweight TrafficChannelAssignment (TCA,) or TCA Lite, message. The TCA Lite message includes all the fields indicated in FIG. 14A. Furthermore, each TCA Lite message includes "N" occurrences of the DSCIncluded and DSC fields, where "N" is the number of SofterHandoff fields set to "0" in the "NumSectors" occurrences of the SectorInformation record. FIGS. 15A-C illustrate a lightweight TrafficChannelAssignment (TCA,) or TCA Lite, message according to another embodiment of the invention.

The TCA Lite message may be used as a replacement for regular full TCA message such that there is only one format, one message ID. Alternately, the TCA Lite message may be separately defined with a different message ID such that the extra flags in the TCA Lite message are not in the full regular version TCA message.

The TCA Lite message further includes the SectorInformation record illustrated in FIG. 14B repeated according to the NumSectors field such that there are "NumSectors" occurrences of the SectorInformation record. Furthermore, the TCA Lite message includes the ActiveSetParameters record illustrated in FIG. 14C repeated according to the NumForwardChannels field such that there are "NumForwardChannels" occurrences of the ActiveSetParameters record.

The TCA Lite message may have the same or different MessageID field as the full version TCA message. If the TCA Lite message has a different MessageID field in order to be distinguishable from the regular TCA message, it shares MessageSequence space with the regular TCA message. Therefore, the value of MessageSequence is incremented in a subsequent TCA or TCA Lite message from the value in the previous message, which is either a TCA or a TCA Lite message.

The ActiveSetParameters record includes all fields from AssignedChannel through MACIndex as illustrated In FIG. 14C. Some of the fields of the ActiveSetParameters record are repeated according to the values of other fields in the TCA Lite message. Each of the "NumForwardChannels" occurrences of the ActiveSetParameters record includes "NumSectors" occurrences of the SectorConfigurationIncluded through MACIndex fields.

The DSCChannelGain and FrameOffset values are omitted if Next2FieldsIncluded is "0." Setting Next2FieldsIncluded to "0" indicates that the values are the same as in the previous message.

The RAChannelGain through SofterHandoff values are omitted if Next3FieldsIncluded is "0." Setting Next3FieldsIncluded to "0" indicates that the values are the same as in the previous message for the sector with the same PilotPN.

The DSC values are omitted if DSCIncluded is "0." Setting DSCIncluded to "0" indicates that the values are the same as in the previous message for the same cell.

All the fields between the ChannelConfigurationIncluded and ReverseChannel fields may be omitted if ChannelConfigurationIncluded is "0." Setting ChannelConfigurationIncluded to non indicates that the carrier configuration is the same as specified in the previous message.

If ReverseChannelDroppingRankIncluded is "0," then ReverseChannelDroppingRank for the carrier is the same as specified in the previous message. Furthermore, ReverseChannelDroppingRankIncluded is not included if there is no reverse link configured for the specified forward link carrier.

If SectorConfigurationIncluded is "0," then all the fields that follow for the sector of the specified carrier may be omitted. Setting SectorConfigurationIncluded to "0" indicates that the values of the fields are the same as specified in the previous message.

The FeedbackMultiplexing Index, FeedbackReverseChannelIndex, ReverseChannelConfiguration and ReverseChannel fields may be omitted if SymmetricFeedbackReverseChannel is set to "1" regardless of the values of the ChannelConfigurationIncluded or ConfigurationsameasPrevChannel fields. Setting SymmetricFeedbackReverseChannel to "1" indicates there will be no feedback multiplexing and the feedback will always be carried on a paired reverse link.

If the SymmetricFeedbackReverseChannel is set to "0," then ChannelConfigurationIncluded indicates whether the FeedbackMultiplexing Index through ReverseChannel fields are included. If the ConfigurationsameasPrevChannel field is present, then the value indicates whether all following fields until ReverseChannelConfiguration field are included.

The DSCSameAsThisForwardChannel field may be omitted if MultipleDSC is "1." Setting MultipleDSC to "1" indicates that the values of the field is the same as specified in the previous message.

If ConfigurationsameasPrevChannel is "1," then all the following fields from DSCSameAsThisForwardChannel through ReverseChannelConfiguration, inclusive, may be omitted. Setting ConfigurationsameasPrevChannel to "1" indicates that the same carrier configuration as specified in the carrier previously iterated is used.

Figure 16:
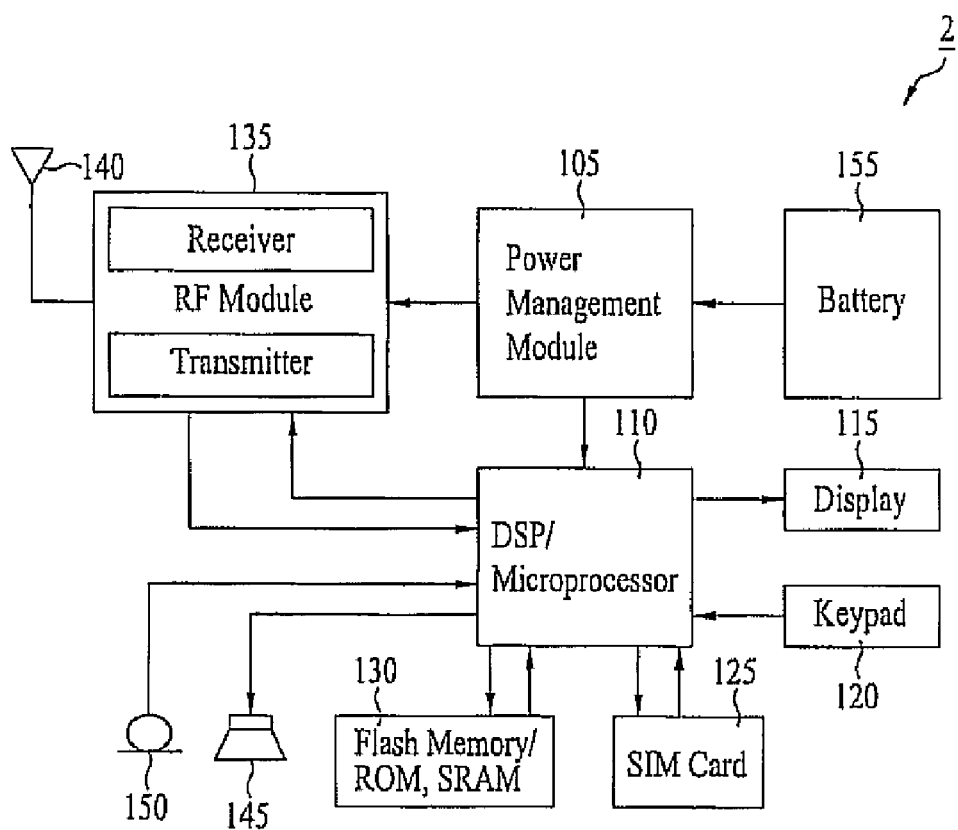
FIG. 16 illustrates a block diagram of a mobile station or access terminal.

FIG. 16 illustrates a block diagram of a mobile station (MS) or access terminal 100 according to one embodiment of the present invention. The AT 100 includes a processor (or digital signal processor) 110, RF module 135, power management module 105, antenna 140, battery 155, display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, by transmitting radio signals comprising voice communication data. The RF module 135 includes a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example. The processor 110 also includes the protocols and functions necessary to perform the various processes described herein with regard to cdma2000 or 1xEV-DO systems.

The processor 110 is adapted to perform the methods disclosed herein for reducing overhead in signaling messages. The processor generates and controls the RF module 135 to receive conventional TCA and TCA Lite messages, as illustrated in FIGS. 14A-C, process the messages and transmit an acknowledgement message.

Although the present invention is described with reference to cdma2000, 1xEV-DO and cdma2000 NxEV-DO, it may also be applied to other applicable communication systems.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of providing signaling information in a multi-carrier mobile communication system, the method comprising:
    generating a traffic channel assignment message comprising first carrier configuration information and second carrier configuration information individually corresponding to a separate carrier of the multi-carrier mobile communication system, wherein the first carrier configuration information comprises a flag and a plurality of fields and the second carrier configuration information comprises a flag and a plurality of removable fields;
    setting the flag of the second carrier configuration information to a predetermined state when a value of each of the plurality of removable fields of the second carrier configuration is the same as a corresponding field of the plurality of fields of the first carrier configuration;
    omitting the plurality of removable fields of the second carrier configuration information when the flag of the second carrier configuration information is set; and
    transmitting the traffic channel assignment message to permit a receiving mobile terminal to use values of the plurality of fields of the first carrier configuration information when the flag of the second carrier configuration information has been set.

2. The method of claim 1, wherein at least some of the plurality of removable fields are configured to include data rate control (DRC) information.

3. The method of claim 1, wherein the plurality of removable fields are concatenated.

4. The method according to claim 1, wherein one of the plurality of fields and one of the plurality of removable fields each comprise a data rate control (DRC) length (DRCLength) field.

5. The method according to claim 1, wherein one of the plurality of fields and one of the plurality of removable fields each comprise a data rate control (DRC) channel gain base (DRCChannelGainBase) field.

6. The method according to claim 1, wherein one of the plurality of fields and one of the plurality of removable fields each comprise an acknowledgement channel gain (ACKChannelGain) field.

7. The method according to claim 1, further comprising:
    performing the transmitting after the omitting.

8. A method of providing signaling information in a multi-carrier mobile communication system, the method comprising:
    receiving a traffic channel assignment message comprising first carrier configuration information and second carrier configuration information individually corresponding to a separate carrier of the multi-carrier mobile communication system, wherein the first carrier configuration information comprises a flag and a plurality of fields and the second carrier configuration information comprises a flag and a plurality of removable fields;
    determining that the flag of the second carrier configuration information is set to a predetermined state indicating that a value of each of the plurality of removable fields of the second carrier configuration is the same as a value of a corresponding field of the plurality of fields of the first carrier configuration information; and
    setting the values of the plurality of removable fields of the second carrier configuration information to the values of the corresponding field of the plurality of fields of the first carrier configuration information.

9. The method of claim 8, wherein at least some of the plurality of removable fields are configured to include data rate control (DRC) information.

10. The method of claim 8, wherein the plurality of removable fields are concatenated.

11. The method according to claim 8, wherein one of the plurality of fields and one of the plurality of removable fields each comprise a data rate control (DRC) length (DRCLength) field.

12. The method according to claim 8, wherein one of the plurality of fields and one of the plurality of removable fields each comprise a data rate control (DRC) channel gain base (DRCChannelGainBase) field.

13. The method according to claim 8, wherein one of the plurality of fields and one of the plurality of removable fields each comprise an acknowledgement channel gain (ACKChannelGain) field.

* * * * *